United States Patent
Huh et al.

(10) Patent No.: US 11,977,754 B2
(45) Date of Patent: May 7, 2024

(54) EXTERNAL INDICATORS FOR ADAPTIVE IN-FIELD RECALIBRATION

(71) Applicant: Seagate Technology LLC, Fremont, CA (US)

(72) Inventors: Stephen S. Huh, Boulder, CO (US); Christopher R. Fulkerson, Firestone, CO (US)

(73) Assignee: SEAGATE TECHNOLOGY LLC, Fremont, CA (US)

( * ) Notice: Subject to any disclaimer, the term of this patent is extended or adjusted under 35 U.S.C. 154(b) by 52 days.

(21) Appl. No.: 17/396,289

(22) Filed: Aug. 6, 2021

(65) Prior Publication Data
US 2021/0365196 A1  Nov. 25, 2021

Related U.S. Application Data

(63) Continuation of application No. 15/666,993, filed on Aug. 2, 2017, now Pat. No. 11,119,669.

(51) Int. Cl.
| | |
|---|---|
| *G06F 12/00* | (2006.01) |
| *G06F 3/06* | (2006.01) |
| *G06F 11/07* | (2006.01) |
| *G06F 11/30* | (2006.01) |
| *G06F 11/34* | (2006.01) |

(52) U.S. Cl.
CPC .......... *G06F 3/0632* (2013.01); *G06F 3/0604* (2013.01); *G06F 3/0674* (2013.01); *G06F 11/0727* (2013.01); *G06F 11/3034* (2013.01); *G06F 11/3058* (2013.01); *G06F 11/3433* (2013.01)

(58) Field of Classification Search
CPC .... G06F 3/0632; G06F 3/0604; G06F 3/0674; G06F 11/3034; G06F 11/3058; G06F 11/3433
See application file for complete search history.

(56) References Cited

U.S. PATENT DOCUMENTS

| | | | |
|---|---|---|---|
| 5,880,902 A * | 3/1999 | Yu .................. | G11B 5/5582 360/78.07 |
| 6,611,393 B1 | 8/2003 | Nguyen et al. | |
| 9,189,309 B1 | 11/2015 | Ma et al. | |
| 2003/0212781 A1 | 11/2003 | Kaneda et al. | |
| 2007/0230002 A1 * | 10/2007 | Kassab ............. | G11B 5/6005 360/75 |
| 2010/0195243 A1 | 8/2010 | Zhu et al. | |
| 2014/0254343 A1 * | 9/2014 | Miller .............. | G11B 33/142 369/53.42 |
| 2014/0364048 A1 * | 12/2014 | Milligan ........... | H05K 7/20736 454/184 |
| 2016/0085451 A1 | 3/2016 | Lee-Baron et al. | |
| 2017/0259023 A1 | 9/2017 | Venegas | |

* cited by examiner

*Primary Examiner* — Gurtej Bansal
(74) *Attorney, Agent, or Firm* — Holzer Patel Drennan

(57) ABSTRACT

In accordance with one implementation, a method for adaptive in-field recalibration includes detecting a potential environmental disturbance for a first storage node in a mass storage system based on an indicator external to the first storage node, and initiating a recalibration of an operational parameter of the first storage node responsive to the detection.

17 Claims, 4 Drawing Sheets

EXTERNAL INDICATORS FOR ADAPTIVE IN-FIELD RECALIBRATION

CROSS-REFERENCE TO RELATED APPLICATIONS

The present application is a continuation application of U.S. application Ser. No. 15/666,993 filed 2 Aug. 2017 entitled "EXTERNAL INDICATORS FOR ADAPTIVE IN-FIELD RECALIBRATION," which is specifically incorporated by reference herein for all that it discloses or teaches.

SUMMARY

Implementations described and claimed herein provide a method for recalibrating an operational parameter of a storage drive based on an external indicator of a potential environmental disturbance. According to one implementation, a method disclosed herein includes detecting a potential environmental disturbance for a first storage node in a mass storage system based on an indicator external to the first storage node and initiating a recalibration of an operational parameter of the first storage node responsive to the detection.

According to another implementation, a storage system disclosed herein includes a first storage controller that manages read/write activities for a first storage node; a second storage controller communicatively coupled to a first storage controller and configured to detect a potential environmental disturbance associated with the first storage node and to instruct the second storage controller to recalibrate an operational parameter in response to the detection.

According to another implementation, a method disclosed herein includes detecting a potential environmental disturbance for a first storage node in a mass storage system based on an indicator internal to the first storage node; comparing internal environmental condition data collected by the first storage node to external environmental condition data collected by one or more adjacent storage nodes; and initiating a recalibration of an operational parameter for the first storage node if the first environmental condition data and the second environmental condition data satisfy a similarity condition.

This Summary is provided to introduce an election of concepts in a simplified form that are further described below in the Detailed Description. This Summary is not intended to identify key features or essential features of the claimed subject matter, nor is it intended to be used to limit the scope of the claimed subject matter. Other features, details, utilities, and advantages of the claimed subject matter will be apparent from the following more particular written Detailed Description of various implementations and implementations as further illustrated in the accompanying drawings and defined in the appended claims.

DETAILED DESCRIPTION

Figure 1:
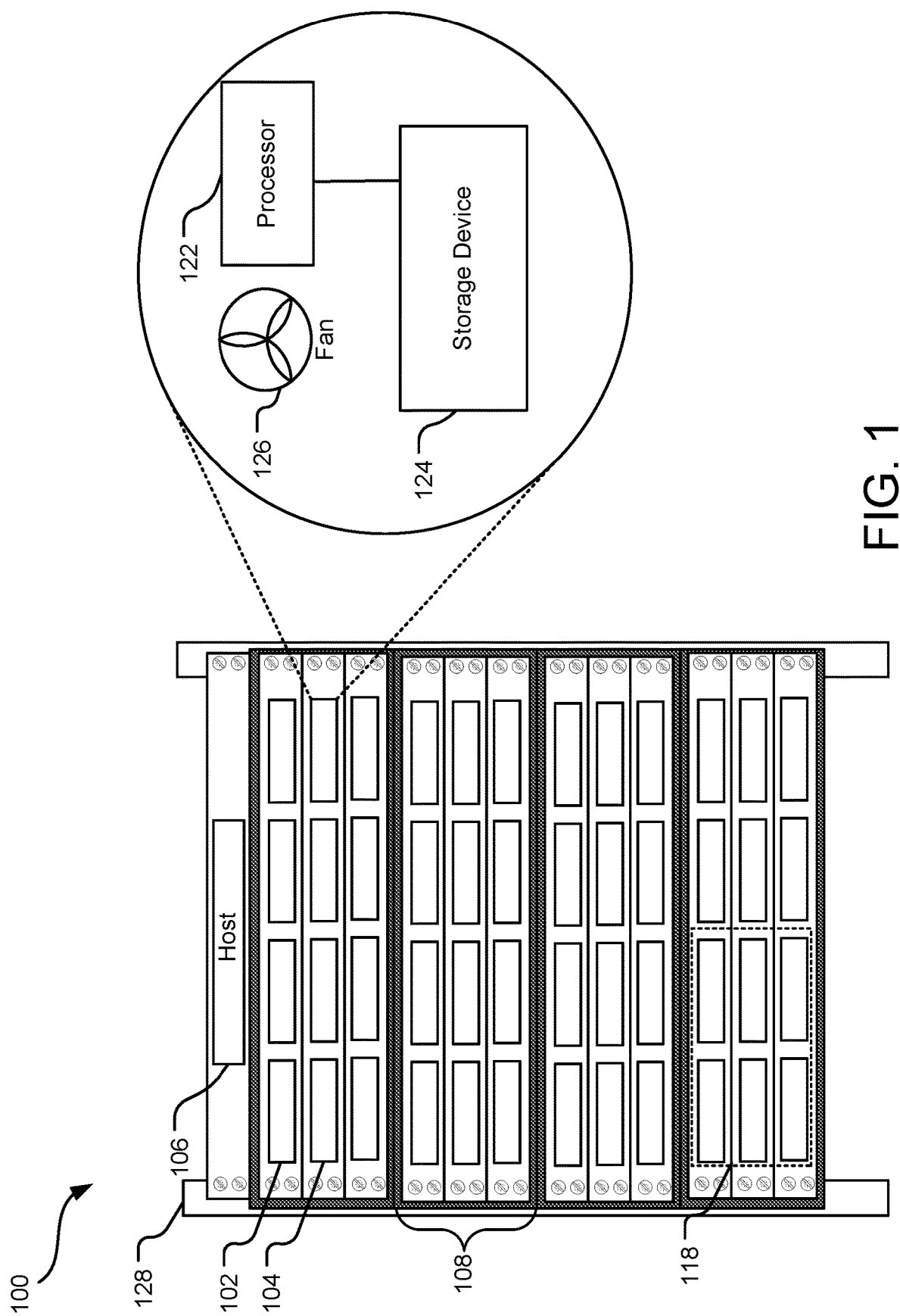
FIG. 1 illustrates an example computing system that implements various error-preventative recalibration techniques responsive to external indicators.

In general, storage devices conduct read and write operations based on a number of operating parameters that depend on environmental conditions internal and/or external to the enclosure of the storage device. Initial factory calibrations may ready a storage device for performance according to a set of expected environmental conditions, such as expected vibration levels, temperatures, operational altitude, humidity, etc. In-the-field changes in these and other environmental operating conditions can cause a storage device to experience a variety of reading, writing, and tracking problems.

Vibration is one another environmental condition on which a number of operating parameters depend. For example, unexpected vibrations can cause an actuator arm to stray outside of an expected vibration fault, causing seek errors. The storage drive may, in some situations, be able to execute a recalibration that tightens up a write fault threshold to reduce the errors in this situation at the cost of slowed performance.

Temperature is another environmental condition on which a number of operating parameters depend. For example, magnetic storage devices include a fly height parameter (e.g., disk-to-head spacing in magnetic storage devices) that can be affected by thermal expansion. Temperatures outside of an expected range may cause the fly height to become too large or small which can, in turn, cause an increase in read, write, or seek errors. Temperature can also impact operational parameters relating to settings for reading and writing data. For example, magnetoresistance read elements have sensitivities that tightly correlate with temperature. Likewise, certain magnetic recording affects such as adjacent track interference (ATI) and side track erasure (STE) become more likely at higher temperatures. Various in-the-field recalibrations can be performed to help tune reader sensitivity and write current to mitigate a likelihood of read and write errors.

Some storage devices are configured to automatically recalibrate one or more operational parameters, such as those described above, responsive to certain "problem" indicators, such as responsive to observance of high seek errors. This in-field adaptive recalibration can, in many cases, reduce errors and/or facilitate recovery of corrupted data. However, data recovery is itself processor-intensive and the effectiveness of data recovery processes are limited by the correction power of the applied error correction code (ECC). More powerful error correction codes occupy more storage bits that cannot be used to store user data. Thus, there exist some tradeoff between storage capacity and guaranteed data integrity. Techniques that prevent errors from occurring in the first place, such as earlier (e.g., preventative) recalibrations can therefore be powerful tools that allow a storage device to delivery higher levels of data integrity while utilizing less powerful corrective resources.

The herein disclosed technology allows a storage device to rely on external indicators from a computing system to preemptively identify prospective environmental changes likely to induce performance degradation within the storage device. By predicting prospective environmental changes and/or reacting quickly to external indictors, a storage device (e.g., a hard drive assembly or solid state device) can initiate various recalibrations to adaptively tune its own operating parameters for improved performance under anomalous environmental conditions before significant errors are observed. As used herein, "significant errors" refers to a quantity or frequency of observed errors that are numerous or frequent enough to automatically trigger a self-diagnostic or recalibration within a storage device. A "preemptive calibration" is a calibration that is performed by a storage device to react to a changing environmental condition before the storage device experiences significant errors as a consequence of that changing environmental condition.

Since preemptive calibrations largely serve to prevent errors, storage systems implementing the disclosed preemptive recalibration techniques can deliver a higher level of guaranteed performance with fewer corrective resources (e.g., less operator maintenance and fewer ECC bits).

FIG. 1 illustrates an example storage system 100 that implements various error-preventative (e.g., preemptive) recalibration techniques. The storage system 100 includes a host computer 106 that is communicatively coupled to a plurality of storage nodes (e.g., storage nodes 102, 104). One or more of the storage nodes 102, 104 may include one or more processing units (e.g., a processor 122) coupled to one or more storage resources (e.g., a storage device 124), such as a hard drive assembly (HDA). Although not shown, one or more of the storage nodes in the storage system 100 may include other types of storage resources in addition to or in lieu of HDAs, such as one or more solid state storage devices. In general, the storage resource 124 of each storage node performs storage-related tasks such as read and write operations, while the processor 122 of each storage node is configured to perform storage and/or computing tasks. A variety of other configurations may also be employed.

In FIG. 1, the storage nodes are shown distributed across multiple chassis (e.g., a chassis 108) mounted on a rack 128. In some cases, one or more rack-mounted chassis racks may be kept in a cabinet. Each chassis 108 includes multiple storage nodes and one or more cooling fans (e.g., fan 126). A variety of different physical configurations may be employed to between the various cooling fans and various storage nodes. In one implementation, a fan is arranged to cool each vertical stacking of three storage nodes. In other systems implementing the disclosed technology, the storage nodes may be arranged in variety of configurations that may employ any number of racks, chassis, and fans (e.g., both internal and/or external to the enclosure(s) holding the storage nodes).

The storage system 100 includes a number of different mechanisms for detecting changes in environmental conditions within the rack 128 or chassis. In one implementation, each of the storage nodes and/or the host computer 106 includes one or more sensors for measuring environmental conditions, such as vibration and temperature. For example, each of the storage nodes (e.g., 102, 104) may include an accelerometer and one or more temperature sensors. In different implementations, other types of environmental sensors (e.g., humidity sensors, altitude sensors) are also included within the storage system 100, such as within each chassis (e.g., the chassis 108) or within one or more of the individual storage nodes.

In one implementation, each storage node has an associated storage controller (e.g., stored in memory and executed by the associated processor 122) that is configured to initiate recalibrations of operational parameters for the storage node responsive to observed internal conditions and/or external indicator(s) that satisfy certain trigger conditions. These recalibrations may be both corrective and preventative in nature.

A storage controller that recalibrates responsive to observed internal conditions may, for example, monitor a number of seek errors that it observes internally. When the number or frequency of seek errors exceeds a threshold value, the storage controller may begin a recalibration or run a self-diagnostic to try to identify an appropriate recalibration. Some storage devices may also periodically sample internal environmental conditions (e.g., temperature, vibration) and self-initiate recalibration(s) when the measured internal environmental conditions are abnormal. In some cases, these self-initiated measurements enable early detection of adverse environmental changes, facilitating recalibrations that improve performance. The self-corrective and error-preventative capability of a storage node is, however, limited by the visibility that each storage node has with respect to its external environment. For example, self-calibrations may occasionally be based on bad data, such as when a faulty temperature reading causes a storage node to recalibrate a write fault threshold or a fly height incorrectly. Alternatively, a storage may be unaware of system component failures and trending temperature changes. Awareness of such events could allow for earlier, more preventative recalibrations.

In many cases, data external to an individual storage drive can be useful in expediting the detection of changing environmental conditions and identification of appropriate corrective actions. Environmental conditions such as temperature and vibration are generally fairly consistent across local areas of a distributed storage system, such as in a local region 118.

In FIG. 1, the various storage nodes of the storage system 100 are configured to execute various preemptive (e.g., error-corrective and/or error-preventative) recalibrations responsive to detection or receipt of external indicator(s) satisfying certain trigger conditions. "External indicators" of a storage node are, for example, indicators arising from conditions measured or observed at a location external to the storage node. For example, the host computer 106 may instruct one or all of the storage nodes in the local region 118 to initiate a recalibration responsive to a determination that one or more storage nodes within the local region 118 has registered an abnormally high temperature measurement.

In different implementations, preventative recalibrations are implemented differently. For example, storage nodes may communicate with one another to self-identify and/or self-react to indicators of prospective environmental disturbances. Alternatively, a chassis or rack-level controller (e.g., a host computer 106) may communicate with the various storage nodes to identify prospective environmental disturbances and/or to selectively issue recalibration commands. Thus, in the following description, actions described as performed by a "storage controller" may, in different implementations, be performed by different types of controllers including without limitation drive-level controllers, chassis-level controllers, and rack-level controllers (e.g., the host computer 106). Also, the term "storage node" may refer to a host (e.g., the host computer 106) or other upper-level storage nodes as well as lower-level storage nodes (e.g., 102, 104) controlled by the host computer 106.

Various storage controllers within the storage system 100 collect and share data that facilitates early identification of potential environmental disturbances as well as early identification and implementation of appropriate corrective actions (e.g., recalibrations). As used herein, the term "potential environmental disturbance" refers to a current or prospective environmental condition (e.g., temperature, vibration, altitude, humidity) that is of a type likely to cause performance degradation at one or more storage nodes within the storage system 100. A potential environmental disturbance may be, for example, an actual observed change in a local environmental condition (e.g., an observed increase temperature or vibration within the chassis 108) or the existence of a condition indicative of a prospective environmental change likely to degrade performance of one or more storage nodes in the storage system 100.

A prospective change in an environmental condition may be evidenced by a variety of different indicators. For example, a mechanical problem, such as a component failure (e.g., a fan), may cause nearby storage nodes to experience elevated temperatures or levels of vibration. Therefore, the detection of a mechanical problem may, in some instances, serve as an external indicator of a potential environmental disturbance for one or more storage nodes. For example, a storage controller may detect a fan failure, anticipate a rise in local temperature, and react by instructing other storage nodes in proximity to the fan to preemptively recalibrate one or more temperature-dependent operational parameters.

Similarly, a control setting alteration may, at times, affect environmental condition(s) within the rack 128 or chassis 108. When, for example, a storage controller increases a fan speed, it may be expected that increased vibrations are likely to be observed in storage nodes physically proximate to the fan. Therefore, a recent or scheduled change in a system control setting may also serve as an external indicator of a potential environmental disturbance for one or more storage nodes. For example, a storage controller may detect an increase in fan RPM speed, consult a physical position map to identify storage nodes that are situated in physical proximity to the fan, and request data from the identified storage nodes to identify early signs of performance degradation in the identified storage nodes. If a correlative effect is observed (e.g., if the storage controller determines that error rates are beginning to rise in one or more of the identified storage nodes as a result of high vibration), the storage controller may instruct the identified storage nodes to initiate one or more recalibrations of vibrationally-dependent operational parameters (e.g., write fault margins). In this scenario, recalibration(s) can be initiated on the affected storage nodes before significant errors are reported. Additionally, the nature of the identified potential environmental disturbance (e.g., the fan RPM change) allows the storage controller to more quickly identify the types of calibrations that are likely to be successful in resolving problems on the affected storage nodes.

In still other scenarios, certain read/write actions may affect local environmental conditions. If, for example, adjacent storage nodes are simultaneously executing high I/O tasks, increases in localized vibration may be expected. Therefore, certain pending or executing read/write operations (e.g., a large batch job pending) at a host may also be external indicators of potential environmental disturbance for one or more storage nodes. For example, the host computer 106 may determine that a large batch job is about to begin and that, as a result, high I/O tasks are to be assigned to a certain region of the chassis 108. Anticipating high levels of vibration in the region with the high I/O task assignments, the host computer 106 may instruct one or more of the storage nodes in the region to initiate recalibrations of vibrationally-dependent operating parameters in preparation of execution of the incoming workload.

In still other implementations, an actual environmental change detected with respect to one storage node can serve as an external indicator of a potential environmental disturbance for another storage node. For example, the storage node 102 may include an accelerometer that records movement along three axes. When the accelerometer records vibrations that exceed a preset threshold within the storage node 102, the associated storage controller requests error data from all storage drives in a same enclosure (e.g., the chassis 108) or region (e.g., the local region 118) to look for evidence of performance degradation due to the high vibrations. If a correlative effect is observed (e.g., if the storage controller of the storage node 102 determines that error rates are rising in the storage node 104 due to increased vibrations), the storage controller of the storage node 102 may instruct the adjacent storage nodes (e.g., the storage node 104) to recalibrate one or more vibrationally-dependent operational parameters. In this scenario, the adjacent storage nodes (e.g., the storage node 104) can be preemptively recalibrated before experiencing significant errors as a result of the local vibrations.

Although such preemptive recalibrations may, in cases, slow device performance, the use of external indicators as inputs to recalibration initiation logic may significantly mitigate and/or prevent the occurrence of errors due to changing environmental conditions, allowing a storage device to ensure high data integrity with less powerful correction tools and, in some cases, operate longer without manual repairs and/or part replacements.

Figure 2:
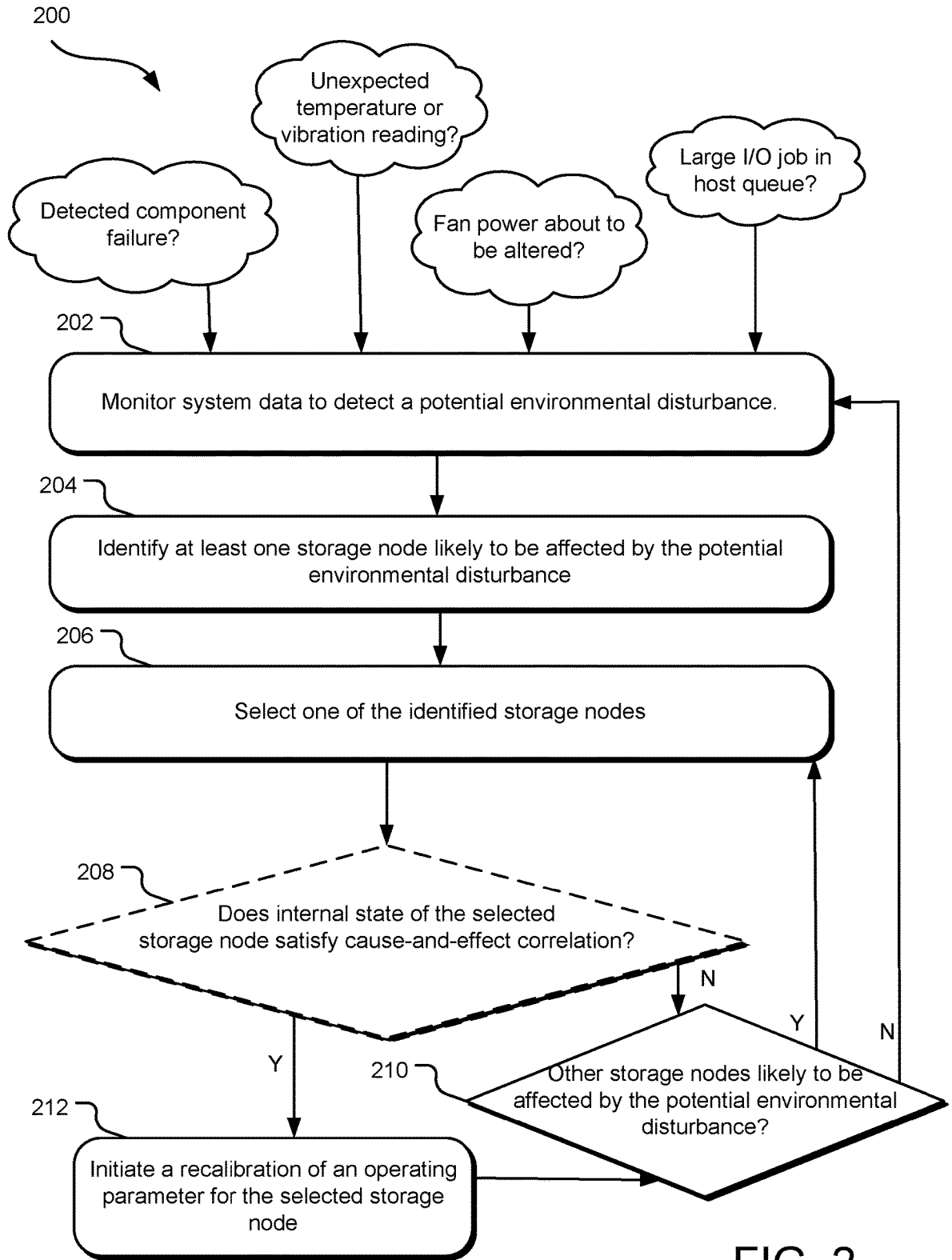
FIG. 2 illustrates example operations for dynamically recalibrating one or more operational parameters at a storage node responsive to external detection of a potential environmental disturbance.

FIG. 2 illustrates example operations 200 for dynamically recalibrating one or more operational parameters at a storage node responsive to an external indicator of a potential environmental disturbance for the storage node. A monitoring operation 202 continuously monitors system data to detect potential environmental disturbance(s) that may affect one or more storage nodes. As explained above, a potential environmental disturbance may be either a current or prospective environmental condition that is of a type likely to cause performance degradation at one or more storage nodes within the storage system.

By example and without limitation, FIG. 2 provides various examples of conditions that the monitoring operation 202 searches for to identify potential environmental disturbances. The illustrated examples pertain to: (1) the detection of a failed or under-performing system component; (2) an unexpected (e.g., unusually high) temperature or vibration measurement; (3) alteration of a system control setting (e.g., scheduled fan power RPM change); and (4) pending or currently-executing read/write operations. As explained below, any of these indicators can flag a potential environmental disturbance.

Responsive to detection of a potential environmental disturbance, an identification operation 204 identifies at least one storage node that is likely to be affected by the potential environmental disturbance. If, for example, the potential environmental disturbance is a failed cooling fan, the identification operation may identify one or more storage nodes in close physically proximity to the cooling fan.

A selection operation 206 selects one of the storage nodes identified via the identification operation 204 for an assessment and determination operation 208. During the assessment and determination operation 208, an internal state of the selected storage node is assessed to determine whether a cause-and-effect condition is satisfied. The cause-and-effect condition is, for example, satisfied when there exists an observable condition within the storage node that is consistent with an effect (e.g., increased errors, vibration, temperature) likely to be caused by the detected potential environmental disturbance.

In some implementations, the assessment and determination operation 208 is performed by the selected storage node. For example, the selected storage node may assess its own internal state, such as by taking one or more sensor measurements to reviewing errors reported, responsive to receipt of an external indicator of the potential environmental disturbance. If, for instance, a host informs the selected storage node of a disturbance source (e.g., a failed fan), the selected storage node may initiate a self-diagnostic that is associated in memory with the disturbance source, such as a diagnostic that immediately determines whether local temperature conditions are consistent with those expected as a result of disturbances caused by a broken fan.

In other implementations, the assessment and determination operation 208 is performed by a node that is not the selected storage node. For example, a host computer may identify a condition likely to cause a temperature increase in a first storage node and ask the first storage node to report back its current internal temperature. Responsive to receipt of the requested temperature, the host may then consult rules or utilize other diagnostic techniques to determine whether the measurement received is consistent with an effect caused by the condition.

If the assessment and determination operation 208 determines that the internal state of the selected storage node is consistent with an effect caused by the potential environmental disturbance, a recalibration operation 212 initiates a recalibration of an operating parameter of the select storage node. If, for example, a host computer performs the assessment and determination operation 208, the host computer may instruct the selected storage node to initiate the recalibration. Alternatively, if the selected storage node performs the assessment and determination operation 208 (e.g., responsive to an external indicator of the potential environmental disturbance), the selected storage node may self-initiate the recalibration without outside instruction. The recalibration is, for example, a recalibration of an operational parameter that is in some way dependent upon an environmental condition alterable by the identified environmental disturbance.

If the assessment and determination operation 208 determines that the internal state of the selected storage node is not consistent with an effect caused by the potential environmental disturbance, a recalibration may not be initiated. Rather, a determination operation 210 determines whether there exist any other storage nodes likely to be affected by the potential environmental disturbance that have not yet been selected by the selection operation 206. If there are additional identified storage nodes remaining, the selection operation 206 selects another one of the identified storage nodes and the operations 208, 210, and 212 repeat. If there are no additional identified storage nodes remaining, the monitoring operation 202 is resumed.

To further exemplify various implementations consistent with the example operations 200, a number of example scenarios are discussed in detail below.

According to one example implementation of the operations 200, a host determines that a system component (e.g., a fan) has failed while performing the monitoring operation 202. At the identification operation 204, the host identifies a number of storage drives positioned in physical proximity to the fan (e.g., in a same corner of a rack), and requests temperature data from each one of the identified storage drives. The identified storage drives provide the requested temperature data and the host determines (via the assessment and determination operation 208) whether the temperature data is consistent with an increase that could occur as a result of the system component failure. If a temperature increase is observed, the host instructs that storage drive experiencing the temperature increase to recalibrate one or more temperature-dependent operational parameters (e.g., fly height spacing, write fault margins, write current magnitude).

In the above-described example, the recalibration is initiated within an identified storage drive (e.g., identified at operation 204) before the internal temperatures of that storage drive climbs enough to cause significant errors that, in turn, trigger the recalibration. Performing this calibration "sooner" in this way allows the recalibrated storage drive to experience fewer total errors and devote fewer processing resources to data recovery.

According to another example implementation of the operations 200, a host performing the monitoring operation 202 receives an indication that high vibrations are being recorded by drives in a lower-left corner of a same chassis. The host determines that the vibrations are a potential environmental disturbance. To better assess the severity of the environmental disturbance, the host requests seek error data from each of the storage drives in the region and confirms that at least some drives within the lower-left corner of the chassis are observing an increase in seek errors. Responsive to the determination, the host instructs each storage node in the region to recalibrate write fault margins to assume a larger level of vibration. In this sense, at least some of the storage drives in the region may be recalibrated for the higher expected vibration levels before significant seek errors are observed.

In still other implementations, the host may initiate the recalibration operation 212 conditionally, such as by weighing various factors to determine whether it is more efficient to perform a calibration now or forego the recalibration and correct errors later. For example, the host may assess whether a changing environmental condition is severe enough to warrant a pause in an active read/write operation. In one such scenario, the host requests seek error data from a storage node after identifying an external indicator of a potential environmental disturbance for the storage node (e.g., failed nearby fan). The host initiates a recalibration on the storage node if the current seek error rate exceeds a predefined error threshold. In one implementation, the redefined error threshold for initiating a recalibration is (1) lower than an error threshold that automatically triggers the calibration(s) within the storage drives in the absence of the external (host) instruction but (2) still high enough that performance of the recalibration saves processing time overall. Stated differently, the recalibrations are initiated if the time lost to pausing the active read/write operation for the calibration is less than or similar to the time saved by lowering the seek error rate (and therefore reducing time for subsequently correcting error).

In another example, the host increases the speed of one fan to compensate for another fan that has failed. The host is programmed to recognize that the current fan speed is in excess of a threshold and therefore likely to impart vibrations capable of degrading performance of nearby storage drives. If the nearby storage nodes are currently performing a low I/O workload, the host may determine that it is more efficient to interrupt the workload to recalibrate the storage drives for the increased vibrations than to allow the workload to finish executing. If, however, the nearby storage nodes are currently performing a high I/O workload, the host may determine that an interrupt for the recalibration is especially costly and that it is more time-efficient to repair errors after the workload has finished executing.

In some implementations, the assessment and determination operation 208 is omitted from the operations 200 and the recalibration operation 212 is initiated responsive to the identification operation 204 (e.g., responsive to identification of the storage node likely to be affected by the detected potential environmental disturbance). For example, the host identifies a potential environmental disturbance in a particular region of a chassis and immediately initiates recalibrations of one or more operating parameters on all drives in the region without determining whether the environmental disturbance is actually affecting those drives.

In one such example implementation of the operations 200 (omitting the assessment and determination operation 208), the host performs the monitoring operation 202 and determines that a system control setting is about to be altered and that such alteration is a prospective environmental disturbance. For example, the host recognizes that a speed of a particular fan is going to be increased to compensate for another fan that has failed. The host recognizes that the adjusted (higher) fan speed is likely to cause an increase in local vibration, and identifies one or more drives in proximity of the adjusted speed fan as likely to be affected by the vibration. Without requesting further data or performing further analysis, the host instructs the identified drives to immediately recalibrate respective write fault margins to tolerate higher levels of vibrations.

In still another example implementation of the operations 200 omitting the assessment and determination operation 208, a host performing the monitoring operation 202 identifies an incoming data access event as a potential environmental disturbance. For example, the host notices that a large batch job is about to start and determines that execution of the job is likely to increase system vibrations since there are multiple high I/O tasks being assigned to adjacent storage nodes. The host identifies the storage nodes most likely to affected by the increased vibrations (e.g., adjacent nodes that are simultaneously executing high I/O tasks of a same workload), and immediately instructs the identified storage nodes to recalibrate for higher vibration tolerances prior to starting the batch job.

In still other implementations not illustrated in the operations 200, the storage system uses external indicators to determine when to perform a calibration. For example, each storage node may be subjected to periodic regular recalibrations at self-timed intervals. In one implementation, a storage node selectively accelerates (e.g., moves forward) a pre-scheduled recalibration responsive to an external indicator of a potential environmental disturbance, such as a disturbance that is likely to occur at the pre-scheduled recalibration time.

Selectively re-scheduling recalibrations based on external indicator(s) (e.g., planned system activities or observed conditions) may provide a substantial performance benefit in a variety of ways, such as by preventing interrupt of large-scale computing tasks. For example, the host may determine that a large, batch processing job is scheduled to occur at the same time as a scheduled recalibration. Rather than allow the recalibration to interrupt the batch processing job, the host may opt to accelerate the scheduled recalibration so that the recalibration completes before the large batch processing job begins.

In another implementation, the host accelerates a planned recalibration responsive to a detected change in an ambient environmental condition. For example, some calibrations may run hourly. An hourly calibration can be moved to an earlier time responsive to detection of an abnormal temperature condition occurring in a certain area of a storage rack. Since recalibrations do consume processing resources and rapid changes in environmental condition are rare, this "re-scheduling" approach is less processor-intensive than an approach that simply increases the frequency of calibrations.

Figure 3:
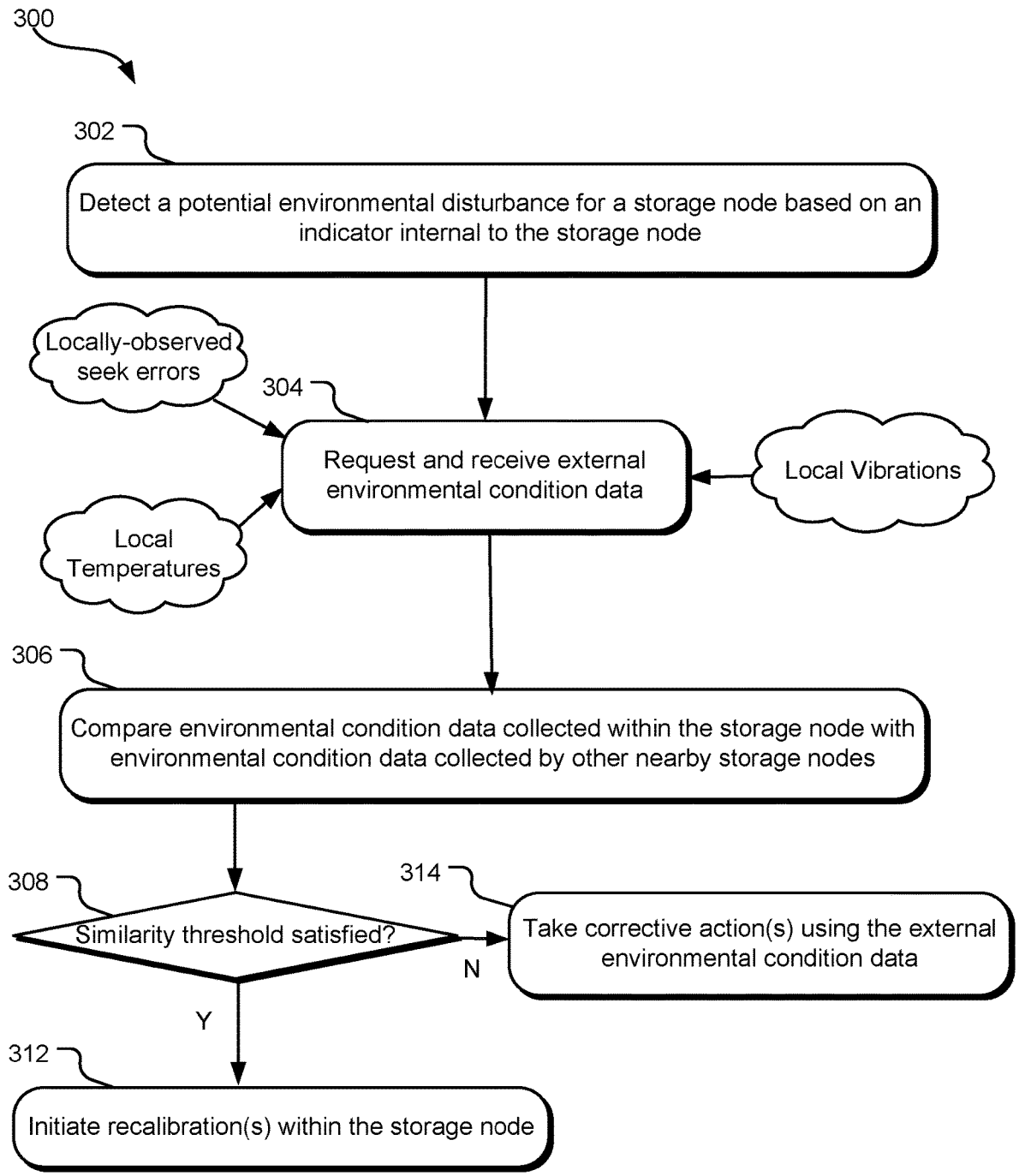
FIG. 3 illustrates example operations for using external environmental indicators to selectively initiate recalibrations of storage nodes in a mass storage system.

FIG. 3 illustrates example operations 300 for using external environmental indicators to selectively initiate recalibrations of storage nodes in a mass storage system. A detection operation 302 detects a potential environmental disturbance for a storage node. In contrast to the example operations 200 of FIG. 2, the detection operation 302 detects the potential environmental disturbance for the storage node based on an internal indicator (e.g., an indicator arising from conditions observed or measured at a location internal to the storage node). For example, the storage node may include a thermocouple that registers an abnormally-high internal temperature or the storage node may register a high number of seek errors.

Responsive to detection of the internal indicator of the potential environmental disturbance, a requesting and receiving operation 304 requests and receives external environmental condition data (e.g., external indicators) indicative of the environment external to the storage node. For example, the storage node may communicate with a host or with other storage nodes directly to request environmental condition data from adjacent or nearby storage nodes, such as data reporting temperatures or vibrations observed at the nearby storage nodes. In one implementation, the storage node registers an abnormally high internal temperature and requests temperature data from a plurality of storage nodes that are in close physical proximity (e.g., neighboring and surrounding storage nodes in a same region of a chassis or rack. This temperature data permits the storage node to perform a more accurate diagnostic of the problem and/or implement a better corrective solution.

A comparing operation 306 compares internal environmental condition data for the storage node with the received external environmental condition data. For example, temperature data received from the surrounding storage nodes is compared to the temperature data captured within the storage node. A determination operation 308 determines whether the internal environmental condition data and the external environmental condition data satisfy a similarity threshold.

If the determination operation 308 determines that the similarity threshold is not satisfied, the storage node determines that the internal indicator (detected via the detection operation 302) was a false positive due to the assumption that environmental conditions do not usually vary dramatically between adjacent storage nodes. For example, a large disparity between measured internal and external temperature conditions may be due to the fact that the storage node has a faulty thermocouple or has taken a bad data point. If, for example, the internal condition data indicates that the internal node temperature is currently 108 degrees Fahrenheit but the external condition data indicates that the surrounding storage nodes have current temperatures ranging between 70 and 74 degrees, it is likely that the 108-degree measurement is a bad data point.

In cases where the similarity threshold is not satisfied, a corrective action operation 310 takes corrective action using the external environmental condition data. In one implementation, the corrective action includes replacing at least some of the internal environmental condition data with adjusted data, such as by updating a parameter stored in memory of the storage node. If, for example, some operational parameters have already been recalibrated based on the faulty measurement, the corrective action operation 310 recalibrates those operational parameters based on corrected measurement data. For example, a storage node may estimate its current internal temperature by extrapolating temperature data from surrounding store nodes, adjust a saved parameter value to reflect the estimated temperature rather than the internally-measured temperature, and use the estimated temperature in a recalibration of a temperature-dependent operational parameter, such as fly height. If no operational parameters have yet been corrupted by the faulty measurements, the corrective action operation 310 may instead correct associated parameter values stored within the storage node. For example, the corrective action operation 310 may update a current temperature parameter value to reflect an estimate of the actual temperature based on the sampled temperatures of the surrounding storage nodes. The updated ("adjusted") value may be used in one or more recalibrations subsequently initiated.

If the determination operation 308 determines that the similarity threshold is satisfied, this similarity between internal and external environmental condition data indicates that the detected internal indicator has correctly flagged the potential environmental disturbance affecting the immediate area. In response, a recalibration operation 312 initiates a recalibration of one or more operational parameters based on the internal environmental condition data to allow the storage node to read and write with fewer errors for the duration of the environmental disturbance. In some cases, the storage node or a host may also initiate recalibrations of other storage nodes in the same area.

Figure 4:
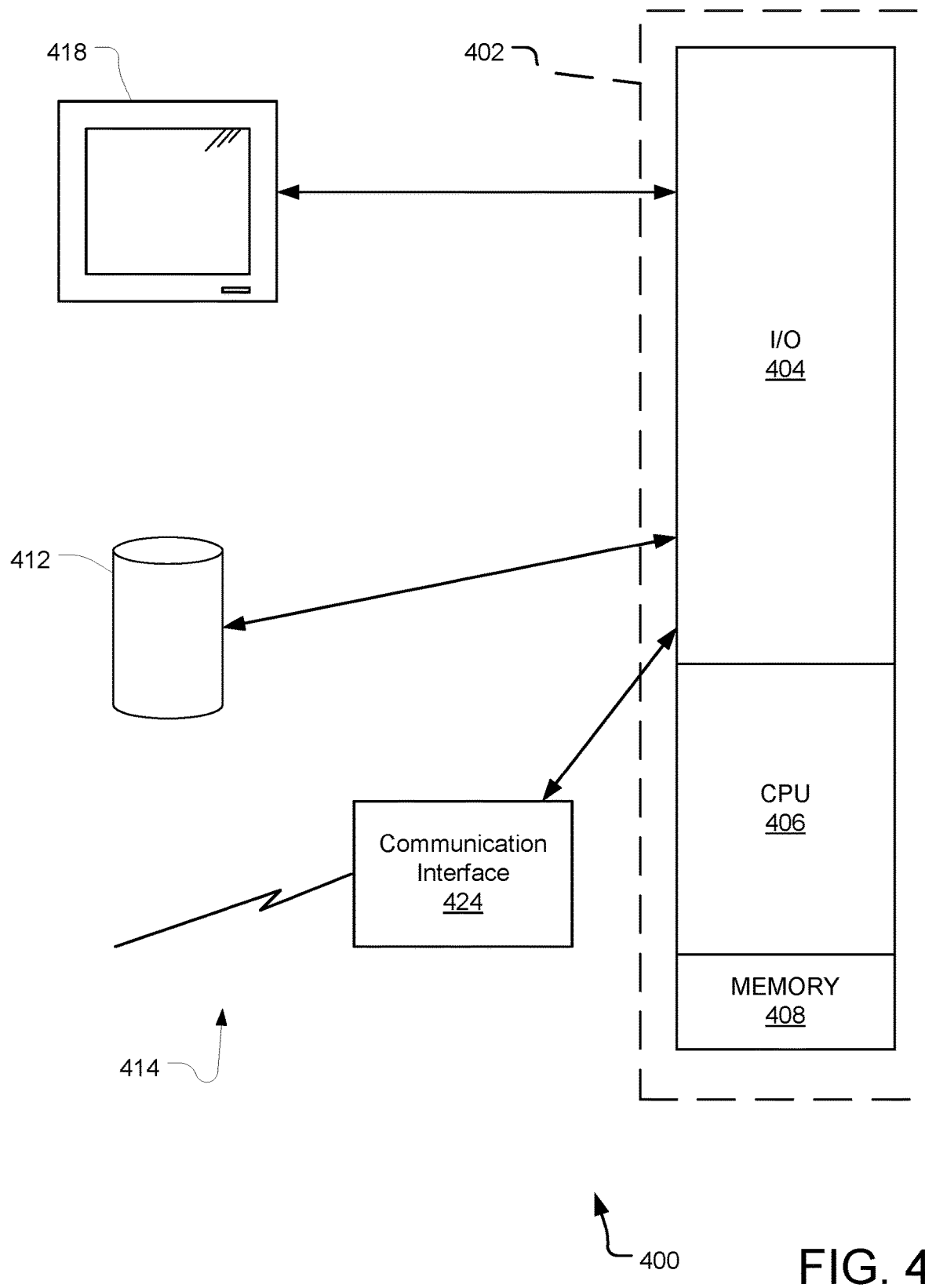
FIG. 4 discloses an example block diagram of a computing system suitable for implementing aspects of the disclosed technology.

FIG. 4 discloses a block diagram of a computer system 400 suitable for implementing aspects of the disclosed technology. In one implementation, the computer system 400 is used to implement a host server having a processor 402 that is communicatively coupled to a plurality of storage nodes (not shown) and/or one or more chassis level controllers (not shown). In another implementation, the computer system 400 implements a single storage node in a mass storage system that is communicatively coupling to a host and/or a plurality of other storage nodes.

The computer system 400 is capable of executing a computer program product embodied in a tangible computer-readable storage medium to execute a computer process. Data and program files may be input to the computer system 400, which reads the files and executes the programs therein using one or more processors. Some of the elements of a computer system 400 are shown in FIG. 4 wherein a processor 402 is shown having an input/output (I/O) section 404, a Central Processing Unit (CPU) 406, and a memory section 408. There may be one or more processors 402, such that the processor 402 of the computing system 400 comprises a single central-processing unit 406, or a plurality of processing units. The processors may be single core or multi-core processors. The computing system 400 may be a conventional computer, a distributed computer, or any other type of computer. The described technology is optionally implemented in software loaded in memory 408, a disc storage unit 412, and/or communicated via a wired or wireless network link 414 on a carrier signal (e.g., Ethernet, 3G wireless, 4G wireless, LTE (Long Term Evolution)) thereby transforming the computing system 400 in FIG. 4 to a special purpose machine for implementing the described operations.

The I/O section 404 may be connected to one or more user-interface devices (e.g., a keyboard, a touch-screen display unit 418, etc.) or a disc storage unit 412. Computer program products containing mechanisms to effectuate the systems and methods in accordance with the described technology may reside in the memory section 404 or on the storage unit 412 of such a system 400.

A communication interface 424 is capable of connecting the computer system 400 to a network via the network link 414, through which the computer system can receive instructions and data embodied in a carrier wave. When used in a local area networking (LAN) environment, the computing system 400 is connected (by wired connection or wirelessly) to a local network through the communication interface 424, which is one type of communications device. When used in a wide-area-networking (WAN) environment, the computing system 400 typically includes a modem, a network adapter, or any other type of communications device for establishing communications over the wide area network. In a networked environment, program modules depicted relative to the computing system 400 or portions thereof, may be stored in a remote memory storage device. It is appreciated that the network connections shown are examples of communications devices for and other means of establishing a communications link between the computers may be used.

In an example implementation, the storage controller may be embodied by instructions stored in memory 408 and/or the storage unit 412 and executed by the processor 402. Further, local computing systems, remote data sources and/or services, and other associated logic represent firmware, hardware, and/or software, which may be configured to adaptively distribute workload tasks to improve system performance. The distributed workload scheduler may be implemented using a general-purpose computer and specialized software (such as a server executing service software), a special purpose computing system and specialized software (such as a mobile device or network appliance executing service software), or other computing configurations. In addition, program data, such as task distribution information, storage node degradation information, and other data may be stored in the memory 408 and/or the storage unit 412 and executed by the processor 402.

The implementations described herein are implemented as logical steps in one or more computer systems. The logical operations of the present invention are implemented (1) as a sequence of processor-implemented steps executing in one or more computer systems and (2) as interconnected machine or circuit modules within one or more computer systems. The implementation is a matter of choice, dependent on the performance requirements of the computer system implementing the invention. Accordingly, the logical operations making up the implementations of the invention described herein are referred to variously as operations, steps, objects, or modules. Furthermore, it should be understood that logical operations may be performed in any order, adding and omitting as desired, unless explicitly claimed otherwise or a specific order is inherently necessitated by the claim language.

The above specification, examples, and data provide a complete description of the structure and use of exemplary implementations of the invention. Since many implementations of the invention can be made without departing from the spirit and scope of the invention, the invention resides in the claims hereinafter appended.

What is claimed is:

1. A method comprising:
   determining by a processor of a first storage node in a mass storage system that the first storage node is scheduled to perform a recalibration at a first time according to a self-timed interval maintained by the processor of the first storage node; and rescheduling, by the processor of the first storage node, the recalibration for a different time than the self-timed interval based on one or more indicators external to the first storage node received from a second node of the mass storage system, the second node comprising storage resources for storage of data and concurrently operating in the mass storage system at a location external to the first node, wherein the one or more indicators comprises an external indicator of a potential environmental disturbance for the first storage node detected by a sensor at the second storage node.

2. The method of claim 1, wherein the potential environmental disturbance comprises detecting a failed cooling fan external to the first storage node.

3. The method of claim 1, wherein detecting the potential environmental disturbance comprises identifying a planned or recent control setting alteration that affects temperature or vibration.

4. The method of claim 3, wherein the planned or recent control setting alteration is a fan speed alteration.

5. The method of claim 1, wherein detecting the potential environmental disturbance comprises identifying a scheduled read/write activity on the second storage node adjacent to the first storage node.

6. The method of claim 1, wherein detecting the potential environmental disturbance comprises detecting a measurement at an external sensor relative to the first storage node, the measurement comprising a value outside of an expected range.

7. The method of claim 1, further comprising:
determining that the potential environmental disturbance and an internal state of the first storage node satisfy a cause-and-effect correlation; and
instructing the first storage node to reschedule the recalibration responsive to the determination.

8. The method of claim 1, wherein the recalibration comprises recalibration of an operational parameter comprising at least one of a write fault margin, a fly height, and a write current magnitude.

9. A method comprising:
determining by a processor of a first storage node in a mass storage system that the first storage node is scheduled to perform a recalibration at a first time according to a self-timed interval maintained by the processor of the first storage node;
rescheduling, by the processor of the first storage node, the recalibration for a different time than the self-timed interval based on one or more indicators external to the first storage node comprising storage resources for storage of data concurrently operating in the mass storage system at a location external to the first node, wherein the one or more indicators comprises an external indicator of a potential environmental disturbance for the first storage node detected by a sensor of a second storage node;
comparing, by the processor of the first storage node, internal environmental condition data collected within the first storage node to external environmental condition data of the external indicator collected at sensors within one or more adjacent concurrently operating storage nodes in the mass storage system; and
initiating, by the processor of the first storage node, the recalibration in response to the internal environmental condition data and the external environmental condition data satisfying a similarity condition.

10. A storage system, comprising:
a first storage controller comprising a processor that manages read/write activities for a first storage node operating in the storage system, wherein the processor of the first storage controller is scheduled to perform a recalibration of the first storage node at a first time according to a self-timed interval maintained by the processor of the first storage node; and
a second storage controller comprising a processor that manages read/write activities for a second storage node operating in the storage system, the second storage controller being communicatively coupled to the first storage controller and configured to:
detect a potential environmental disturbance associated with the first storage node, and communicate an instruction from the second storage node to the first storage controller to reschedule the recalibration of the first storage node in response to detecting the potential environmental disturbance, wherein the second storage controller detects the potential environmental disturbance by detecting the potential environmental disturbance based on an indicator observed by a sensor within the second storage node concurrently operating within the storage system and at a location external to the first storage node.

11. The storage system of claim 10, wherein the second storage controller detects the potential environmental disturbance by detecting a failed cooling fan within the second storage node.

12. The storage system of claim 10, wherein the second storage controller detects the potential environmental disturbance by identifying a recent control setting alteration.

13. The storage system of claim 10, wherein the second storage controller detects the potential environmental disturbance by identifying a scheduled read access activity on the second storage node.

14. The storage system of claim 10, wherein the second storage controller detects the potential environmental disturbance responsive to a measurement from an external sensor relative to the first storage node if the measurement comprises a value outside of a predefined range.

15. The storage system of claim 10, wherein the second storage controller is further configured to:
assess an internal state of the first storage node responsive to detection of the potential environmental disturbance;
determine, based on assessing the internal state, that the potential environmental disturbance and the internal state of the first storage node satisfy a cause-and-effect correlation; and
instruct the first storage controller to reschedule the recalibration responsive to the determination.

16. The storage system of claim 10, wherein the recalibration comprises recalibration of an operational parameter comprising at least one of a write fault margin, a fly height, and a write current magnitude.

17. The storage system of claim 10, wherein the second storage controller is further configured to:
compare internal environmental condition data collected within the first storage node to external environmental condition data of the external indicator collected at the second storage node; and
initiate the recalibration in response to the internal environmental condition data and the external environmental condition data satisfying a similarity condition.

* * * * *